United States Patent
Abuelsaad et al.

(10) Patent No.: US 9,678,746 B2
(45) Date of Patent: Jun. 13, 2017

(54) CODING CONVENTION DISCOVERY AND ENFORCEMENT

(71) Applicant: International Business Machines Corporation, Armonk, NY (US)

(72) Inventors: Kelly Abuelsaad, Somers, NY (US); Shane B. McElligott, Apex, NC (US); Hien Q. Nguyen, Beaverton, OR (US); Jeffrey D. Young, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/448,301

(22) Filed: Jul. 31, 2014

(65) Prior Publication Data

US 2016/0034275 A1 Feb. 4, 2016

(51) Int. Cl.
*G06F 9/44* (2006.01)

(52) U.S. Cl.
CPC .................. *G06F 8/72* (2013.01); *G06F 8/30* (2013.01); *G06F 8/33* (2013.01)

(58) Field of Classification Search
CPC ........................................................ G06F 8/33
See application file for complete search history.

(56) References Cited

U.S. PATENT DOCUMENTS

| | | | |
|---|---|---|---|
| 5,040,214 A | 8/1991 | Grossberg et al. | |
| 6,243,859 B1 * | 6/2001 | Chen-Kuang | G06F 8/33 717/111 |
| 7,412,388 B2 * | 8/2008 | Dalal et al. | 704/260 |
| 8,739,150 B2 * | 5/2014 | Gass | G06F 8/36 717/168 |
| 2002/0100016 A1 * | 7/2002 | Van De Vanter et al. | 717/112 |
| 2002/0133812 A1 * | 9/2002 | Little | G06F 8/10 717/140 |
| 2005/0015747 A1 * | 1/2005 | Zatloukal | G06F 8/33 717/109 |
| 2005/0223354 A1 * | 10/2005 | Drissi et al. | 717/114 |
| 2006/0101435 A1 | 5/2006 | Akilov et al. | |
| 2007/0168946 A1 * | 7/2007 | Drissi et al. | 717/110 |
| 2008/0072210 A1 * | 3/2008 | Rush | G06F 8/33 717/121 |

(Continued)

FOREIGN PATENT DOCUMENTS

WO 2013060525 A1 5/2013

OTHER PUBLICATIONS

Basit, Hamid Abdul, and Stan Jarzabek. "A data mining approach for detecting higher-level clones in software." IEEE Transactions on Software engineering 35.4 (2009): 497-514.*

(Continued)

*Primary Examiner* — Matthew Brophy
(74) *Attorney, Agent, or Firm* — Maeve M. Carpenter; Hunter E. Webb; Keohane & D'Alessandro PLLC

(57) ABSTRACT

In general, embodiments of the invention provide an approach to discover and enforce coding conventions among a group of developers. Specifically, source code files for a group of developers are imported from a code repository. The source code files are analyzed to discover the commonly used coding conventions of the group. Convention templates are generated based on these coding conventions. Each convention template is assigned a weighted value, and the convention templates are reviewed and approved based on the weighted value.

20 Claims, 5 Drawing Sheets

(56) References Cited

U.S. PATENT DOCUMENTS

| | | | | | |
|---|---|---|---|---|---|
| 2008/0235661 | A1* | 9/2008 | Arpana | ................... | G06F 8/30 717/116 |
| 2008/0320438 | A1* | 12/2008 | Funto et al. | ................... | 717/106 |
| 2008/0320444 | A1* | 12/2008 | Meijer | ................... | G06F 8/437 717/110 |
| 2009/0300589 | A1* | 12/2009 | Watters | ................ | G06Q 40/00 717/140 |
| 2009/0313609 | A1* | 12/2009 | Ackerman | ............... | G06F 8/36 717/127 |
| 2010/0042976 | A1 | 2/2010 | Hines | | |
| 2010/0050151 | A1* | 2/2010 | Balasubramanian | ..... | G06F 8/33 717/105 |
| 2010/0175044 | A1* | 7/2010 | Doddavula et al. | .......... | 717/104 |
| 2012/0174061 | A1* | 7/2012 | McCollum | ............... | G06F 8/33 717/106 |
| 2012/0198419 | A1* | 8/2012 | Neill | ................... | G06F 17/276 717/109 |
| 2014/0013297 | A1* | 1/2014 | Cook et al. | ................... | 717/105 |
| 2014/0137074 | A1* | 5/2014 | Hey et al. | ................... | 717/101 |
| 2014/0173563 | A1* | 6/2014 | Dias et al. | ................... | 717/123 |

OTHER PUBLICATIONS

Li, Zhenmin, and Yuanyuan Zhou. "PR-Miner: automatically extracting implicit programming rules and detecting violations in large software code."ACM SIGSOFT Software Engineering Notes. vol. 30. No. 5. ACM, 2005.*

Livshits, Benjamin, and Thomas Zimmermann. "DynaMine: finding common error patterns by mining software revision histories." ACM SIGSOFT Software Engineering Notes. vol. 30. No. 5. ACM, 2005.*

Wing C. Kwong et al., "Image Transmission in Multicore-Fiber Code-Division Multiple-Access Networks", IEEE Communications Letters, vol. 2, No. 10, Oct. 1998, pp. 285-287.

Steven P. Justice et al., "Pattern Matching to Automate Solution Discovery Using Disparate Data Sources", Publication Date Nov. 30, 2007, IPCOM000160821D, Copyright 2007 Microsoft, 12 pages.

Robert W. Depree, "Pattern Recognition in Software Engineering", IPCOM000131602D, IP.com Publication Date Nov. 11, 2005, Copyright 1983 Institute of Electrical and Electronics Engineers, Inc., 11 pages.

PRQA Programming Research, "Analyze Your Code of Your Chosen Coding Standard using QA C++PRQA", http://www.programmingresearch.com/products/qacpp/, Printed May 20, 2014, 3 pages.

Parasoft JTEST, "Java Static Analysis, Code Review, Unit Testing, Runtime Error Detection", http://www.parasoft.com/jtest, Printed May 20, 2014, 4 pages.

Colin Depradine, "Creating a Java Design and Code Convention Mentor Using Evolutionary Computation", Copyright 2001 IEEE, pp. 756-760.

Herbert P. Yule et al., "Progress Report: Automated Computer Software Development Standards Enforcement", Copyright 1991 IEEE, pp. 124-131.

* cited by examiner

CODING CONVENTION DISCOVERY AND ENFORCEMENT

TECHNICAL FIELD

The present invention relates to discovery and enforcement of coding conventions among a group of developers. Specifically, the present invention relates to coding pattern recognition and coding standards generation based upon an associated weight and approval level of the coding pattern.

BACKGROUND

Coding conventions are a set of guidelines and recommended programming styles for a given programming language. These conventions usually cover file organization, indentation, comments, declarations, statements, naming conventions, common patterns, programming practices, programming principles, programming rules of thumb, architectural best practices, etc. These are guidelines for software structural quality. By writing consistent code, developers help both themselves and, more importantly, other developers who work in the same codebase. The coding conventions may be formalized into a documented set of rules or an informal set of practices for a development group to follow. Formal coding conventions are a top-down approach, often recommended and enforced long after program development is underway.

In today's development environments, coding conventions are enforced within the environment, but those conventions must already exist as a part of a development methodology, which is known to a group of developers. Often times though, developers tend to develop their own coding conventions that they wish others in the group to adapt in order that the programming code remains consistent and easy to follow. Today's convention enforcements do not provide a means for discovering and subsequently enforcing a coding convention that is unique to the group.

SUMMARY

In general, embodiments of the invention provide an approach to discover and enforce coding conventions among a group of developers. Specifically, source code files for a group of developers are imported from a code repository. The source code files are analyzed to discover the commonly used coding conventions of the group. Convention templates are generated based on these coding conventions. Each convention template is assigned a weighted value, and the convention templates are reviewed and approved based on the weighted value.

In one embodiment, there is a method for discovering and enforcing a coding convention standard. In this embodiment, the method comprises: analyzing a set of source code files; detecting one or more coding conventions based on the analysis; generating a set of coding templates based on the one or more coding conventions; and assigning a weighted value for each coding template in the set of coding templates.

In a second embodiment, there is a system for discovering and enforcing a coding convention standard, comprising: a memory medium comprising program instructions; a bus coupled to the memory medium; and a processor, for executing the program instructions, coupled to the memory medium that when executing the program instructions causes the system to: analyze a set of source code files; detect one or more coding conventions based on the analysis; generate a set of coding templates based on the one or more coding conventions; and assign a weighted value for each coding template in the set of coding templates.

In a third embodiment, there is computer program product for discovering and enforcing a coding convention standard. In this embodiment, the computer program product comprises a computer readable storage device, and program instructions stored on the computer readable storage device, to: analyze a set of source code files; detect one or more coding conventions based on the analysis; generate a set of coding templates based on the one or more coding conventions; and assign a weighted value for each coding template in the set of coding templates.

BRIEF DESCRIPTION OF THE DRAWINGS

These and other features of this invention will be more readily understood from the following detailed description of the various aspects of the invention taken in conjunction with the accompanying drawings in which.

Figure 1:
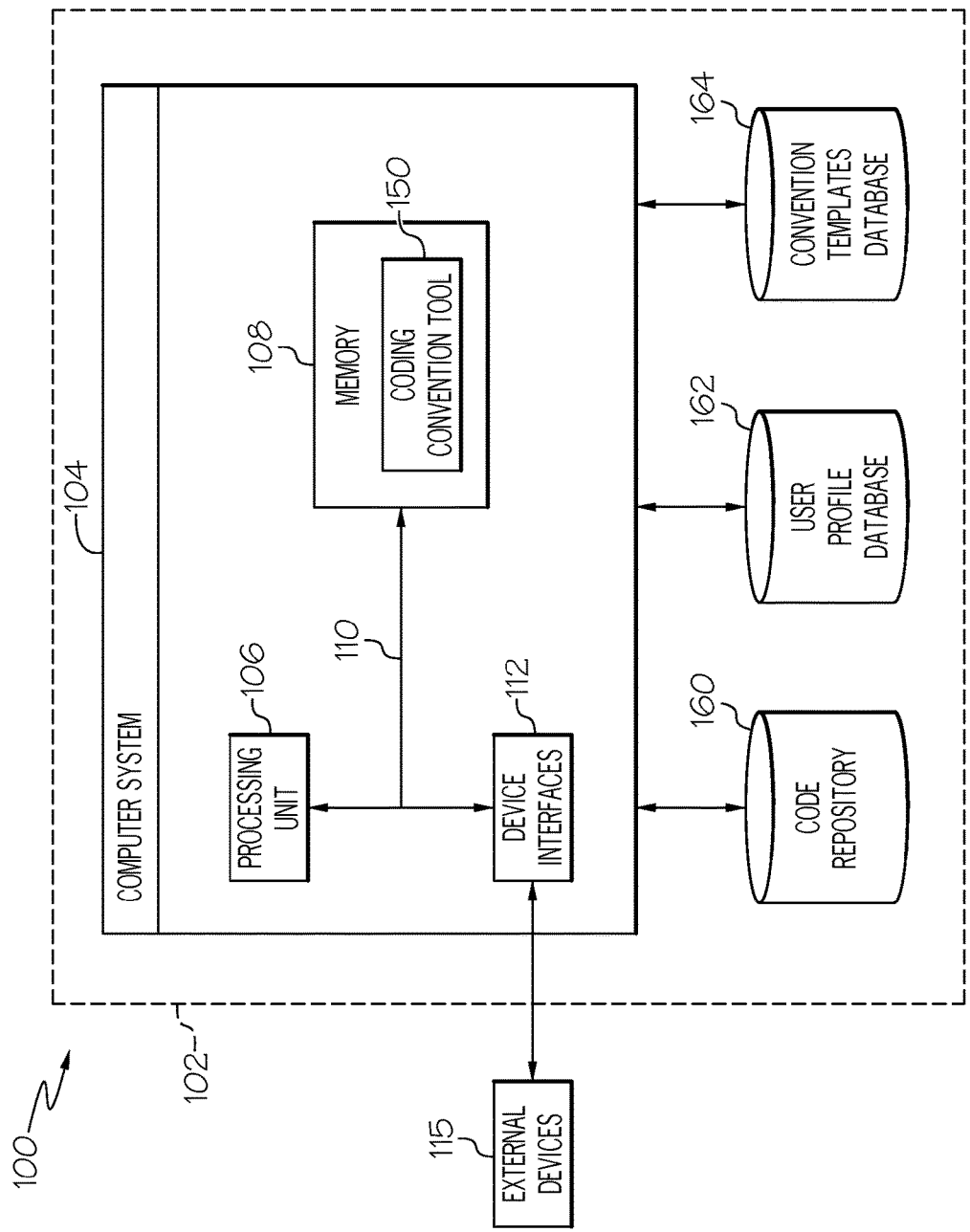
FIG. 1 depicts a computerized implementation according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Example embodiments will now be described more fully herein with reference to the accompanying drawings, in which example embodiments are shown. This disclosure may, however, be embodied in many different forms and should not be construed as limited to the example embodiments set forth herein. Rather, these example embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof. Furthermore, the term "developer" refers to any person who writes computer software. The term can refer to a specialist in one area of computer programming or to a generalist who writes code for many kinds of software.

As indicated above, embodiments of the invention provide an approach to discovery and enforcement of coding conventions among a group of developers. Specifically, source code files for a group of developers are imported from a code repository. The source code files are analyzed to discover the commonly used coding conventions of the group. Convention templates are generated based on these coding conventions. Each convention template is assigned a weighted value, and the convention templates are reviewed and approved based on the weighted value.

FIG. 1 depicts a computerized implementation 100 according to an embodiment of the present invention. As depicted, implementation 100 includes computer system 104 deployed within a computer infrastructure 102. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, computer infrastructure 102 is intended to demonstrate that some or all of the components of implementation 100 could be deployed, managed, serviced, etc., by a service provider who offers to implement, deploy, and/or perform the functions of the present invention for others.

Computer system 104 is intended to represent any type of computer system that may be implemented in deploying/realizing the teachings recited herein. In this particular example, computer system 104 represents an illustrative system for providing a passport according to the present invention. It should be understood that any other computers implemented under the present invention may have different components/software, but will perform similar functions. As shown, computer system 104 includes a processing unit 106, memory 108 for storing a coding convention tool 150, a bus 110, and device interfaces 112.

Processing unit 106 collects and routes signals representing outputs from external devices 115 (e.g., a keyboard, a pointing device, a display, a graphical user interface, etc.) to coding convention tool 150. The signals can be transmitted over a LAN and/or a WAN (e.g., T1, T3, 56 kb, X.25), broadband connections (ISDN, Frame Relay, ATM), wireless links (802.11, Bluetooth, etc.), and so on. In some embodiments, the signals may be encrypted using, for example, trusted key-pair encryption. Different external devices may transmit information using different communication pathways, such as Ethernet or wireless networks, direct serial or parallel connections, USB, Firewire®, Bluetooth®, or other proprietary interfaces. (Firewire is a registered trademark of Apple Computer, Inc. Bluetooth is a registered trademark of Bluetooth Special Interest Group (SIG)).

In general, processing unit 106 executes computer program code, such as program code for operating coding convention tool 150, which is stored in memory 108 and/or code repository 160. While executing computer program code, processing unit 106 can read and/or write data to/from memory 108, code repository 160, user profile database 162, and/or convention templates database 164. Code repository 160, user profile database 162, and convention templates database 164 can include VCRs, DVRs, RAID arrays, USB hard drives, optical disk recorders, flash storage devices, or any other similar storage device. Although not shown, computer system 104 could also include I/O interfaces that communicate with one or more external devices 115 that enable a user to interact with computer system 104.

With respect to informal coding conventions, it is common for a group of developers to fall into habitual, undocumented code practices. In small, fast moving code bases, or extremely large code bases, coding conventions may spring up organically. In one embodiment of the present invention, an existing code repository associated with a group (e.g., a predefined team) of developers is analyzed. The code repository is inspected to discover a development group's informal coding conventions, and guides subsequent development along those conventions. Use of common conventions among developers allows for debugging of code to be simpler. Also, novice developers can increase productivity and efficiency, as the proposed system will help them discover and use the coding conventions of the group.

Figure 2:
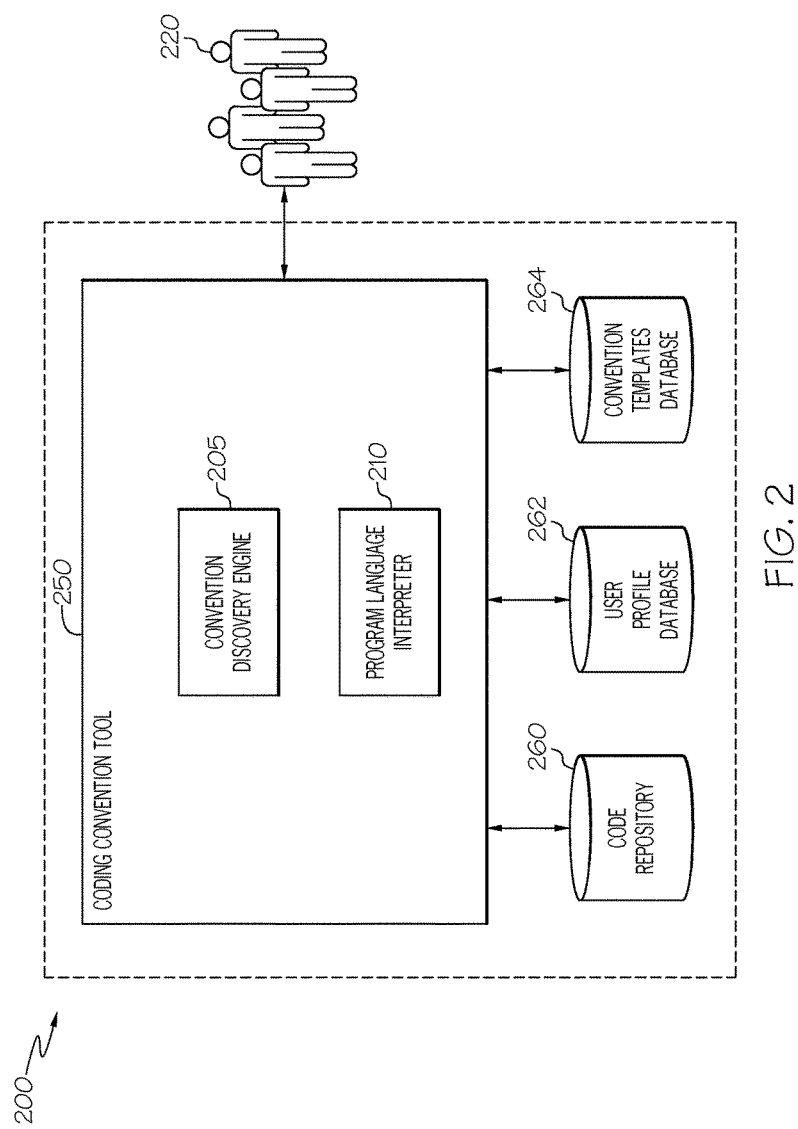
FIG. 2 shows a more detailed view of an example system diagram for implementing a discovery phase according to an embodiment of the present invention.

FIG. 2 depicts a more detailed view of an example system diagram 200 for implementing a discovery phase according to an embodiment of the present invention. Example system diagram 200 consists of coding convention tool 250, code repository 260, user profile database 262, and/or convention templates database 264. Coding convention tool 250 includes convention discovery engine 205, and program language interpreter 210. Approvers 220 are also shown. Approvers 220 may include developers, quality assurance (QA) engineers, managers, business analysts, enterprise architects, project managers, and others. The operations of system diagram 200 will be described in more detail with reference to a method flow diagram of FIG. 3.

Figure 3:
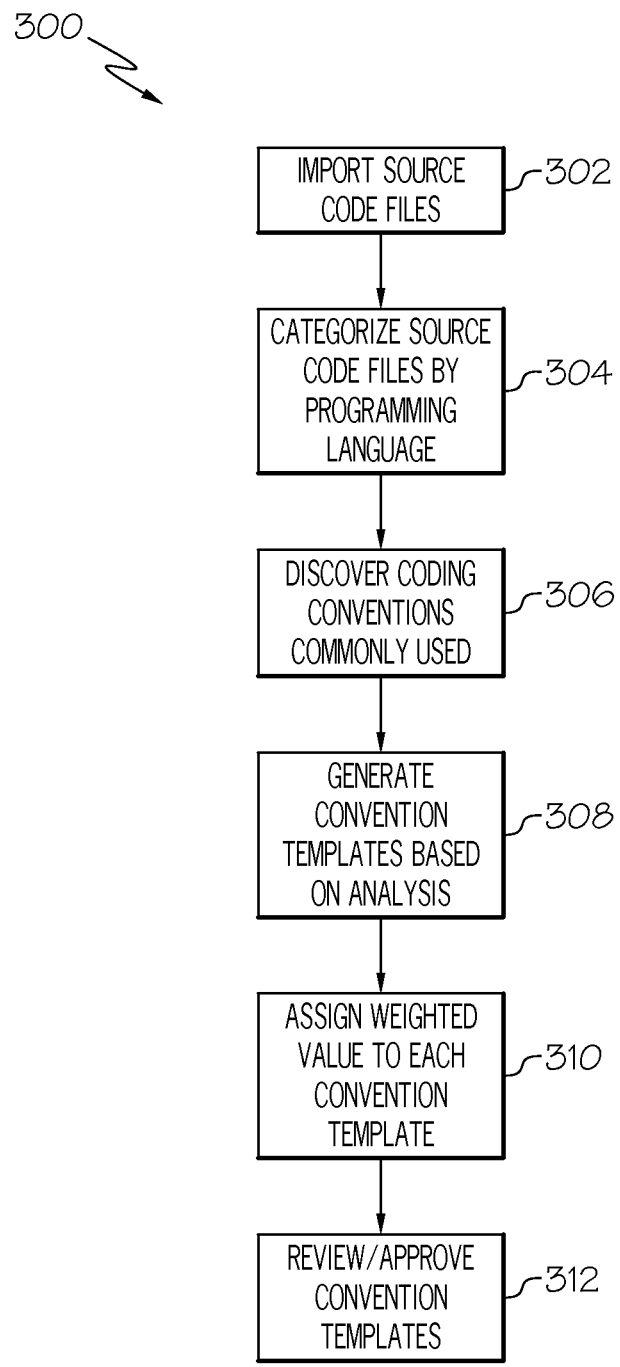
FIG. 3 depicts a method flow diagram for coding convention discovery according to an embodiment of the present invention.

Referring now to FIGS. 2-3, a method flow diagram 300 for coding convention discovery according to an embodiment of the present invention is depicted. During this discovery phase, an analysis of code repository is done to establish convention template database 264, which will be used to enforce future convention usage in a development environment. At 302, the convention discovery engine 205 imports the source code files residing in code repository 260.

At 304, the program language interpreter 210 analyzes the code and logically identifies which source code files are written in the same language. For example, some code files may be written in Java®, others in Python®, and so on. (Java is a registered trademark of Oracle Corporation. Python is a registered trademark of the Python Software Foundation). The program language interpreter 210 logically identifies the source code files and groups each code file into an appropriate language category.

At 306, the convention discovery engine 205 discovers the coding conventions commonly used by the group of developers. Of the source code files that share a common language, the convention discovery engine 205 searches for coding conventions among the different coding styles that are used. The coding conventions may include, but are not limited to, the constructs used (e.g., "If" statements, "For Loop" statements, "Switch" statements, etc.), format of constructs used (e.g., in-line or multi-line format), naming conventions, frequency of public and private methods and variables per class, style of comments, style of header information, and so on. The examples listed are illustrative only and not intended to be limiting.

At 308, from the detected coding conventions, the convention discovery engine 205 generates a set of convention templates based on the detected coding conventions. Convention templates may include, among other things, commonly used syntax, code patterns and constructs, and common variable names. The examples listed are illustrative only and not intended to be limiting. The convention templates may be stored in convention template database 264. At 310, the convention engine 205 assigns a weighted value to each convention template. In one example, a convention template that is used by a majority of senior developers may be assigned a higher weighted value (e.g., a value of '8') than a coding convention that is used primarily by novice developers (e.g., a value of '1'). Information relating to each developer may be stored in user profile database 262. The user profile database 262 may be populated using a human resources database or by other means. In another example, a convention template that conforms to established industry coding standards may be assigned a high weighted value (e.g., a value of '10').

At 312, approval of each generated convention template by approvers 220 is required prior to being accepted as a standard to be used in future program development by the group of developers. In one example, approvers 220 may approve one or more convention templates based on the weighted value of each respective convention template. Each approved convention template is integrated into a set of standards of the software development environment associated with the group of developers.

Figure 4:
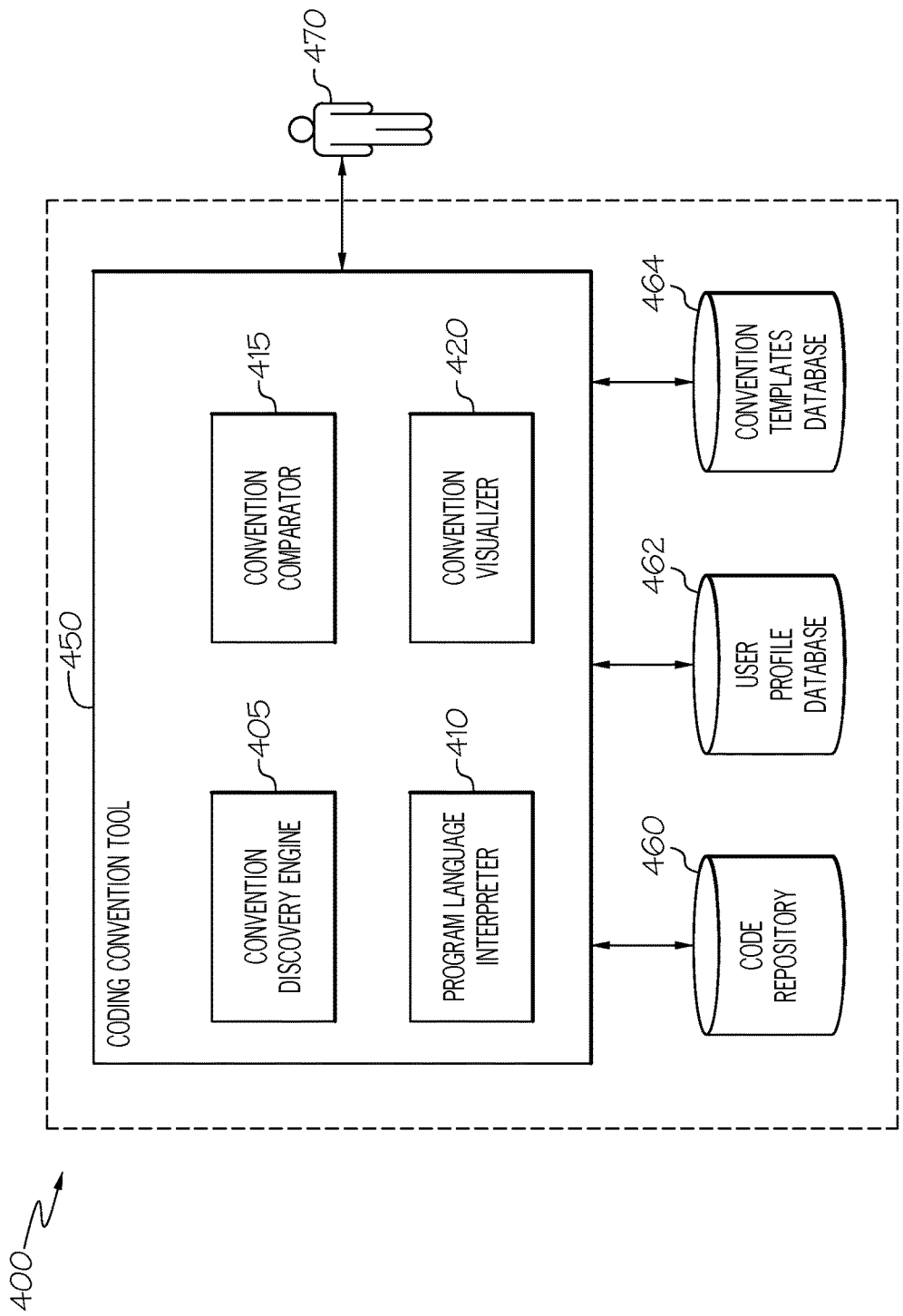
FIG. 4 depicts a more detailed view of an example system diagram for implementing an enforcement phase according to an embodiment of the present invention.

FIG. 4 depicts a more detailed view of an example system diagram 400 for implementing an enforcement phase according to an embodiment of the present invention. Similar to FIG. 2, example system diagram 400 consists of coding convention tool 450, code repository 460, user profile database 462, and/or convention templates database 464. Coding convention tool 450 includes convention discovery engine 405, program language interpreter 410, convention comparator 415, and convention visualizer 420. Developer 470 is also shown. The operations of system diagram 400 will be described in more detail with reference to a method flow diagram of FIG. 5.

Figure 5:
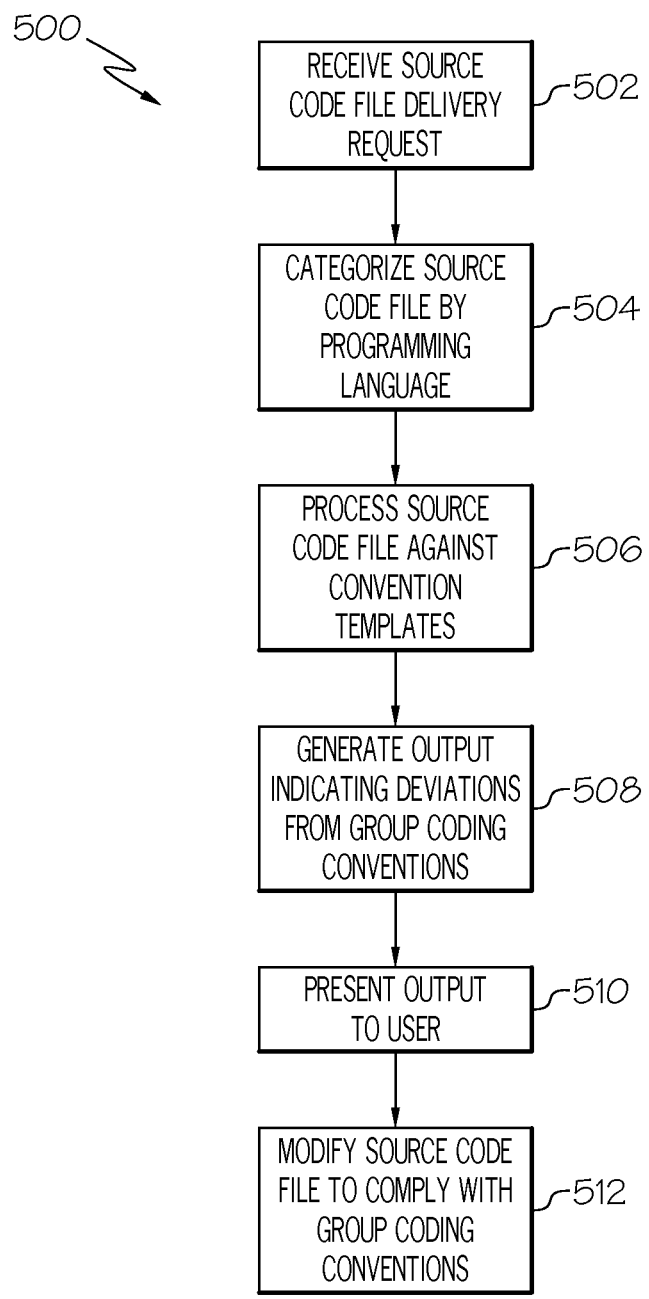
FIG. 5 depicts a method flow diagram for coding convention enforcement according to an embodiment of the present invention.

Referring now to FIGS. 4-5, a method flow diagram 500 for coding convention enforcement according to an embodiment of the present invention is depicted. When a user is creating or modifying a source code file, the convention comparator 415 can cross-check the source code file with the group's coding conventions stored in convention template database 464. At 502, the convention comparator 415 detects or is notified of a source code file delivery request to code repository 460.

At 504, the program language interpreter 410 logically identifies the source code file and groups the source code file into an appropriate language category. At 506, the convention comparator 415 processes the source code file against the convention templates stored in convention template database 464. At 506, the convention comparator 415 generates output indicating any issues found within the source code file that do not conform to the coding standards. The output may include warnings and/or recommendations to assist the developer in conforming to the coding standards. The recommendations may include links or snippets of the generalized syntax proposed, or a reference to another location in the code base to use as an example or guide. Group members using this style may be listed as well. At 510, the convention visualizer 420 provides a graphical analysis of the output. At 512, the user may modify the source code file to comply with the group's coding conventions based on the graphical analysis that is provided.

It will be appreciated that the method process flow diagrams 300 and 500 of FIGS. 3 and 5, respectively, represent one possible implementation of a process flow for coding convention discovery, and that other process flows are possible within the scope of the invention. The method process diagrams discussed above illustrate the architecture, functionality, and operation of possible implementations of systems, methods and computer program products according to various embodiments of the present invention. In this regard, each portion of each flowchart may represent a module, segment, or portion of code, which comprises one or more executable instructions for implementing the specified logical function(s). It will also be noted that each block of each flowchart illustration can be implemented by special purpose hardware-based systems that perform the specified functions or acts.

Further, it can be appreciated that the approaches disclosed herein can be used within a computer system for discovering and enforcing a coding convention standard. In this case, as shown in FIGS. 1-2, coding convention tool 150 can be provided, and one or more systems for performing the processes described in the invention can be obtained and deployed to computer infrastructure 102 (FIG. 1). To this extent, the deployment can comprise one or more of (1) installing program code on a computing device, such as a computer system, from a computer-readable storage medium; (2) adding one or more computing devices to the infrastructure; and (3) incorporating and/or modifying one or more existing systems of the infrastructure to enable the infrastructure to perform the process actions of the invention.

The exemplary computer system 104 (FIG. 1) may be described in the general context of computer-executable instructions, such as program modules, being executed by a computer. Generally, program modules include routines, programs, people, components, logic, data structures, and so on, which perform particular tasks or implement particular abstract data types. Exemplary computer system 104 may be practiced in distributed computing environments where tasks are performed by remote processing devices that are linked through a communications network. In a distributed computing environment, program modules may be located in both local and remote computer storage media including memory storage devices.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, coding convention tool 150 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided with this invention an approach for discovering and enforcing a coding convention standard. While the invention has been particularly shown and described in conjunction with a preferred embodiment thereof, it will be appreciated that variations and modifications will occur to those skilled in the art. Therefore, it is to be understood that the appended claims are intended to cover all such modifications and changes that fall within the true spirit of the invention.

What is claimed is:

1. A method for discovering and enforcing a coding convention standard, comprising the computer-implemented steps of:
   analyzing a set of source code files coded by a group of programmers;
   detecting one or more coding conventions based on the analysis, the detected one or more coding conventions being structural quality guidelines and recommended stylistic elements for a given programming language present in a particular piece of source code, that include file organization, indentation, comments, declarations, statements, naming conventions, common patterns, programming practices, programming principles, programming rules of thumb, and architectural best practices;
   generating a set of coding templates of the structural quality guidelines and recommended stylistic elements based on the one or more coding conventions detected in the set of source code files that are unique to the group of programmers;
   assigning a weighted value for each coding template in the set of coding templates, wherein the weighted value assigned to a coding template that conforms to established industry coding standards is higher than the weighted value assigned to a coding template that does not conform to established industry coding standards;
   integrating a coding template from the set of coding templates into a set of standards that is specific to the group of programmers based on the weighted value assigned to the coding template; and
   enforcing the structural quality guidelines and recommended stylistic elements in the selected coding template against future developed source code.

2. The method of claim 1, further comprising importing the set of source code files from a code repository.

3. The method of claim 1, further comprising approving a coding template based on the weighted value of the coding template.

4. The method of claim 1, wherein the weighted value is based on an experience level of a developer.

5. The method of claim 1, further comprising categorizing each of the source code files based on programming language.

6. The method of claim 2, further comprising:
   receiving a source file delivery request to have a source file added to the code repository;
   comparing the source code file with the set of coding templates; and
   providing output based on the comparison.

7. The method of claim 6, wherein the output includes a graphical analysis having at least one of a warning or recommendation based on a coding template and further having a proposed syntax and a listing of specific members of the group of programmers that use the proposed syntax.

8. A system for discovering and enforcing a coding convention standard, comprising:
   a memory medium comprising program instructions;
   a bus coupled to the memory medium; and
   a processor, for executing the program instructions, coupled to the memory medium that when executing the program instructions causes the system to:
   analyze a set of source code files coded by a group of programmers;
   detect one or more coding conventions based on the analysis, the detected one or more coding conventions being structural quality guidelines and recommended stylistic elements for a given programming language present in a particular piece of source code, that include file organization, indentation, comments, declarations, statements, naming conventions, common patterns, programming practices, programming principles, programming rules of thumb, and architectural best practices;
   generate a set of coding templates of the structural quality guidelines and recommended stylistic elements based on the one or more coding conventions detected in the set of source code files that are unique to the group of programmers;
   assign a weighted value for each coding template in the set of coding templates, wherein the weighted value assigned to a coding template that conforms to established industry coding standards is higher than the weighted value assigned to a coding template that does not conform to established industry coding standards;
   integrate a coding template from the set of coding templates into a set of standards based that is specific to the group of programmers on the weighted value assigned to the coding template; and
   enforce the structural quality guidelines and recommended stylistic elements in the selected coding template against future developed source code.

9. The system of claim 8, the memory medium further comprising instructions to import the set of source code files from a code repository.

10. The system of claim 8, the memory medium further comprising instructions to approve a coding template based on the weighted value of the coding template.

11. The system of claim 8, wherein the weighted value is based on an experience level of a developer.

12. The system of claim 8, the memory medium further comprising instructions to categorize each of the source code files based on programming language.

13. The system of claim 9, the memory medium further comprising instructions to:
   receive a source file delivery request to have a source file added to the code repository;

compare the source code file with the set of coding templates; and provide output based on the comparison.

14. The system of claim 13, wherein the output includes at least one of a warning or recommendation based on a coding template and further having a proposed syntax and a listing of specific members of the group of programmers that use the proposed syntax.

15. A computer program product for discovering and enforcing a coding convention standard, the computer program product comprising a computer readable storage device, and program instructions stored on the computer readable storage device, to:

analyze a set of source code files coded by a group of programmers;

detect one or more coding conventions based on the analysis, the detected one or more coding conventions being structural quality guidelines and recommended stylistic elements for a given programming language present in a particular piece of source code, that include file organization, indentation, comments, declarations, statements, naming conventions, common patterns, programming practices, programming principles, programming rules of thumb, and architectural best practices;

generate a set of coding templates of the structural quality guidelines and recommended stylistic elements based on the one or more coding conventions detected in the set of source code files that are unique to the group of programmers; and assign a weighted value for each coding template in the set of coding templates, wherein the weighted value assigned to a coding template that conforms to established industry coding standards is higher than the weighted value assigned to a coding template that does not conform to established industry coding standards;

integrate a coding template from the set of coding templates into a set of standards that is specific to the group of programmers based on the weighted value assigned to the coding template; and enforce the structural quality guidelines and recommended stylistic elements in the selected coding template against future developed source code.

16. The computer program product of claim 15, further comprising program instructions stored on the computer readable storage device to import the set of source code files from a code repository.

17. The computer program product of claim 15, further comprising program instructions stored on the computer readable storage device to approve a coding template based on the weighted value of the coding template.

18. The computer program product of claim 15, wherein the weighted value is based on an experience level of a developer.

19. The computer program product of claim 16, further comprising program instructions stored on the computer readable storage device to categorize each of the source code files based on programming language.

20. The computer program product of claim 19, further comprising program instructions stored on the computer readable storage device to:

receive a source file delivery request to have a source file added to the code repository;

compare the source code file with the set of coding templates; and provide output based on the comparison, wherein the output includes at least one of a warning or recommendation based on a coding template and further having a proposed syntax and a listing of specific members of the group of programmers that use the proposed syntax.

* * * * *